US 11,267,155 B2

(12) United States Patent
Su et al.

(10) Patent No.: US 11,267,155 B2
(45) Date of Patent: Mar. 8, 2022

(54) CUTTING APPARATUS

(71) Applicant: DISCO CORPORATION, Tokyo (JP)

(72) Inventors: Zhibo Su, Tokyo (JP); Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/930,786

(22) Filed: May 13, 2020

(65) Prior Publication Data

US 2020/0361109 A1 Nov. 19, 2020

(30) Foreign Application Priority Data

May 13, 2019 (JP) .............................. JP2019-090892

(51) Int. Cl.
*B26D 7/26* (2006.01)
*B26D 1/15* (2006.01)
(Continued)

(52) U.S. Cl.
CPC ......... *B26D 7/2621* (2013.01); *B26D 1/0006* (2013.01); *B26D 1/15* (2013.01); *B26D 2001/0046* (2013.01); *F16H 1/145* (2013.01)

(58) Field of Classification Search
CPC ...... B26D 7/2621; B26D 1/15; B26D 1/0006; B26D 2001/0046; F16H 1/145; F16H 1/203; B28D 5/02; B28D 5/0058; B28D 5/0094; B28D 5/0011; B28D 5/0029; B28D 5/0052

See application file for complete search history.

(56) References Cited

U.S. PATENT DOCUMENTS 3,886,822 A * 6/1975 Pauley .................. B25B 23/145
                                                             81/470
5,269,104 A * 12/1993 DiBiagio ............... A46B 13/02
                                                    15/104.03
(Continued)

FOREIGN PATENT DOCUMENTS

| CN | 1943981 A | 4/2007 | |
|----|-----------|--------|----|
| GB | 2396127 A * | 6/2004 | ............. B25B 21/00 |

(Continued)

OTHER PUBLICATIONS

Intellectual Property Office of Singapore, Search Report and Written Opinion, dated May 13, 2021 (3 pages).

*Primary Examiner* — Jonathan G Riley
(74) *Attorney, Agent, or Firm* — Greer, Burns & Crain, Ltd.

(57) ABSTRACT

A cutting apparatus includes a blade changing apparatus for changing a cutting blade mounted on a spindle of a first cutting unit and changing a cutting blade mounted on a spindle of a second cutting unit. The blade changing apparatus includes a nut mounting and demounting unit for mounting and demounting a nut in each of the first and second cutting units and a blade mounting and demounting unit for mounting and demounting the cutting blade in each of the first and second cutting units. The nut mounting and demounting unit includes a rotating shaft, a first nut rotating portion fixed to one end of the rotating shaft, a second nut rotating portion fixed to the other end of the rotating shaft, a motor, and a power transmitting unit connected to the motor and the rotating shaft.

9 Claims, 5 Drawing Sheets

(51) Int. Cl.
*B26D 1/00* (2006.01)
*F16H 1/14* (2006.01)

(56) References Cited

U.S. PATENT DOCUMENTS

| | | | | |
|---|---|---|---|---|
| 6,030,326 | A | | 2/2000 | Azuma et al. |
| 6,080,073 | A | * | 6/2000 | Liu .......................... B62M 6/55 |
| | | | | 180/206.1 |
| 7,458,295 | B1 | * | 12/2008 | Lu .......................... B25B 13/463 |
| | | | | 81/57.14 |
| 2005/0279519 | A1 | * | 12/2005 | Clark .................... B25B 21/026 |
| | | | | 173/216 |

FOREIGN PATENT DOCUMENTS

| | | | | |
|---|---|---|---|---|
| JP | 2007229843 | A | * | 9/2007 |
| JP | 2007229843 | A | | 9/2007 |
| JP | 2016168652 | A | | 9/2016 |

\* cited by examiner

CUTTING APPARATUS

BACKGROUND OF THE INVENTION

Field of the Invention

The present invention relates to a cutting apparatus for cutting a workpiece.

Description of the Related Art

In a device chip fabrication process, a wafer having a plurality of devices on the front side is used. That is, the front side of the wafer is partitioned by a plurality of crossing division lines (streets) to thereby define a plurality of separate regions where the plural devices such as integrated circuits (ICs) and large scale integration (LSI) circuits are respectively formed. By dividing the wafer along the division lines, a plurality of device chips respectively including the plural devices can be obtained.

For example, a cutting apparatus is used to divide the wafer. The cutting apparatus includes a chuck table for holding the wafer and a cutting unit for cutting the wafer held on the chuck table. The cutting unit includes a spindle (rotating shaft) and an annular cutting blade mounted on the spindle for cutting the wafer. The cutting blade is fastened to the front end portion of the spindle by using a nut. By rotating the cutting blade mounted on the spindle of the cutting unit and feeding the cutting unit toward the chuck table, the wafer is cut and divided by the cutting blade. There is a case that what is generally called a facing dual type cutting apparatus including a pair of cutting units is used to cut the wafer. In the facing dual type cutting apparatus, cutting blades are opposed to each other. The use of such a facing dual type cutting apparatus allows two kinds of cutting operations having different cutting conditions to be performed simultaneously. The cutting conditions include the kind of the cutting blade and the depth of cut in the wafer.

The cutting blade is worn during the cutting of the wafer and it is therefore changed periodically. In changing the cutting blade, the nut fastening the cutting blade (old one) is first loosened and removed. Thereafter, the cutting blade is removed from the spindle. Thereafter, a new cutting blade is mounted to the front end portion of the spindle and next fastened by the nut. In the case that such an operation of changing the cutting blade is manually performed, time and effort are expended. Further, in this case, there is a possibility that an operator may erroneously drop the cutting blade or the nut during the operation. To cope with this problem, attempts have been made to automate this operation of changing the cutting blade. Japanese Patent Laid-open No. 2007-229843 discloses a blade changing apparatus provided in a facing dual type cutting apparatus and designed to automatically perform the operation of changing the cutting blade. This blade changing apparatus includes a mechanism (blade mounting and demounting unit) for mounting and demounting the cutting blade and a mechanism (nut mounting and demounting unit) for mounting and demounting the nut for fastening the cutting blade to the front end portion of the spindle.

SUMMARY OF THE INVENTION

The blade changing apparatus provided in the facing dual type cutting apparatus includes a pair of nut rotating portions respectively corresponding to the pair of cutting units. The nut fastening the cutting blade mounted in one of the two cutting units is held and rotated by one of the two nut rotating portions, and the nut fastening the cutting blade mounted in the other cutting unit is held and rotated by the other nut rotating portion. Further, a pair of motors is connected to the pair of nut rotating portions, so as to rotate the same. However, each motor for rotating each nut rotating portion has a considerable size and weight. Accordingly, in the configuration that the pair of motors is connected to the pair of nut rotating portions, the blade changing apparatus is increased in size and weight. Further, in configuring and operating such a blade changing apparatus, a plurality of motors must be prepared and maintenance therefore is required, causing an increase in cost.

It is therefore an object of the present invention to provide a cutting apparatus having a blade changing apparatus which can be reduced in size, weight, or cost.

In accordance with an aspect of the present invention, there is provided a cutting apparatus including a chuck table for holding a workpiece, a pair of first and second cutting units for cutting the workpiece held on the chuck table, each of the first and second cutting units including a spindle and a cutting blade mounted on the spindle, and a blade changing apparatus for changing the cutting blade mounted on the spindle of the first cutting unit and changing the cutting blade mounted on the spindle of the second cutting unit, the blade changing apparatus including a nut mounting and demounting unit for mounting and demounting a nut for fastening the cutting blade to the spindle in each of the first and second cutting units, and a blade mounting and demounting unit for mounting the cutting blade to the spindle in each of the first and second cutting units and demounting the cutting blade from the spindle in each of the first and second cutting units, the nut mounting and demounting unit including a rotating shaft, a first nut rotating portion fixed to one end of the rotating shaft for holding and rotating the nut for fastening the cutting blade to the spindle of the first cutting unit, a second nut rotating portion fixed to the other end of the rotating shaft for holding and rotating the nut for fastening the cutting blade to the spindle of the second cutting unit, a motor, and a power transmitting unit connected to the motor and the rotating shaft for transmitting the power of the motor to the rotating shaft to thereby rotate the rotating shaft.

Preferably, the axis of rotation of the first nut rotating portion is aligned with the axis of rotation of the second nut rotating portion. Preferably, the power transmitting unit includes a speed reducer for making the rotational speed of the rotating shaft smaller than the rotational speed of the motor, thereby making the torque of each of the first nut rotating portion and the second nut rotating portion larger than the torque of the motor. More preferably, the speed reducer includes a bevel gear or a hypoid gear.

The cutting apparatus of the present invention includes the blade changing apparatus for changing the cutting blade. The blade changing apparatus includes the motor, the rotating shaft, the first nut rotating portion fixed to one end of the rotating shaft, the second nut rotating portion fixed to the other end of the rotating shaft, and the power transmitting unit for transmitting the power of the motor to the rotating shaft. The blade changing apparatus can transmit the power of the motor through the power transmitting unit and the rotating shaft to the first nut rotating portion and the second nut rotating portion. That is, the two nut rotating portions can be driven by a single motor. Accordingly, it is unnecessary to provide individual motors for the first nut rotating portion and the second nut rotating portion, so that the blade changing apparatus can be reduced in size, weight, or cost.

The above and other objects, features, and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
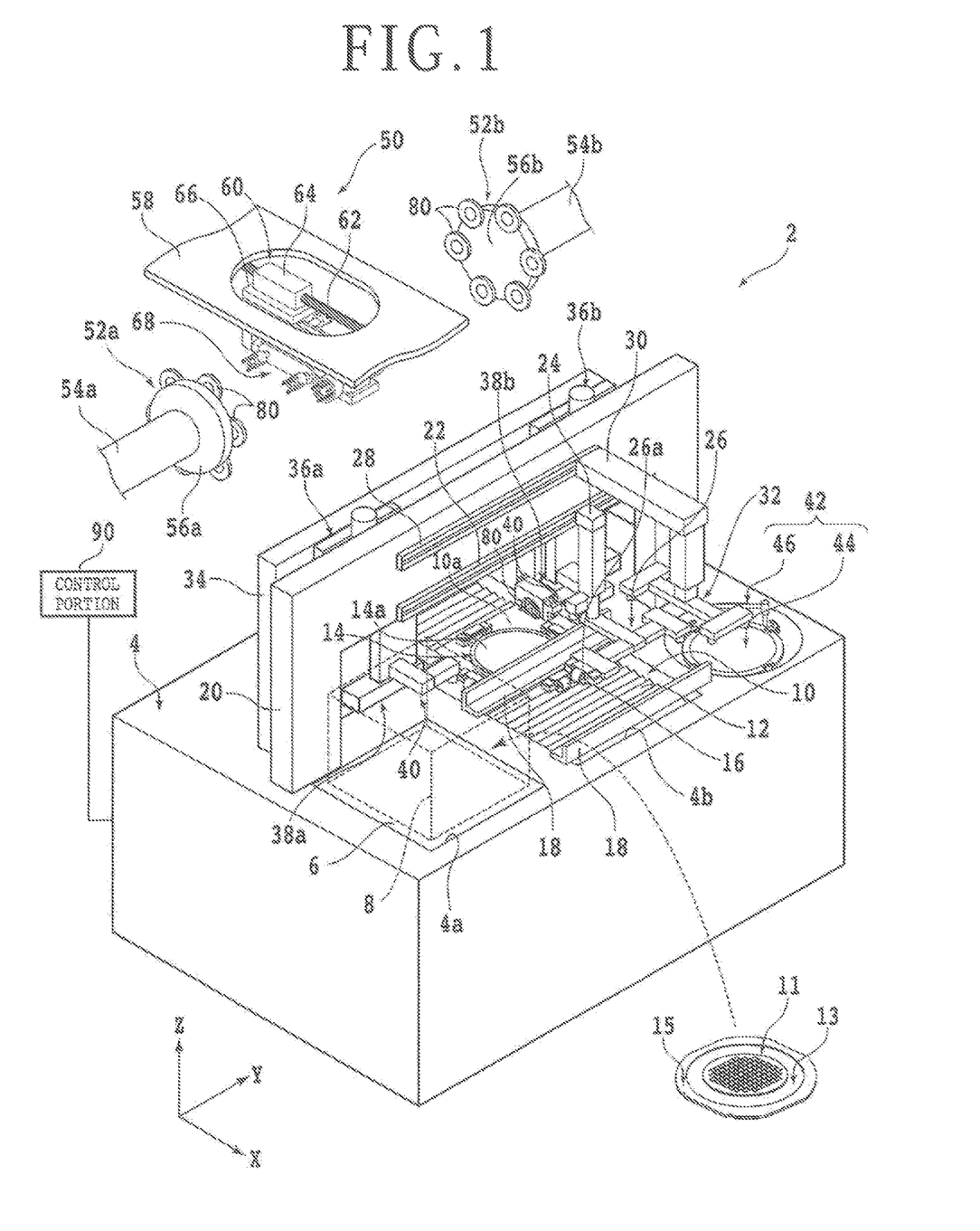
FIG. 1 is a perspective view depicting a cutting apparatus.

A preferred embodiment of the present invention will now be described with reference to the attached drawings. There will first be described a cutting apparatus 2 according to this preferred embodiment with reference to FIG. 1. FIG. 1 is a perspective view of the cutting apparatus 2.

As depicted in FIG. 1, the cutting apparatus 2 includes a base housing 4 for supporting various components of the cutting apparatus 2. A rectangular opening 4a is formed on the upper surface of the base housing 4 at a left front corner portion thereof. A cassette support table 6 is provided in the rectangular opening 4a so as to be vertically movable by an elevating mechanism (not depicted). A cassette 8 is adapted to be mounted on the upper surface of the cassette support table 6. The cassette 8 is capable of storing a plurality of workpieces 11. In FIG. 1, the outline of the cassette 8 is depicted by a broken line.

Each workpiece 11 is a disk-shaped wafer formed of a semiconductor such as silicon. A plurality of crossing division lines (streets) are formed on the front side of the workpiece 11 to thereby define a plurality of separate regions where a plurality of devices such as ICs and micro electro mechanical systems devices (MEMSs) are respectively formed. By using the cutting apparatus 2 to cut the workpiece 11 along the division lines, the workpiece 11 can be divided into a plurality of device chips respectively including the plural devices. A circular adhesive tape 13 is attached to the back side of the workpiece 11. The adhesive tape 13 has a diameter larger than that of the workpiece 11. The adhesive tape 13 is formed of resin, for example. The workpiece 11 is positioned at a central portion of the adhesive tape 13. An annular frame 15 having a circular central opening is attached to a peripheral portion of the adhesive tape 13. The central opening of the frame 15 has a diameter larger than that of the workpiece 11. Accordingly, the workpiece 11 is supported through the adhesive tape 13 by the frame 15 in such a manner that the workpiece 11 is disposed in the central opening of the frame 15. In this manner, the workpiece 11 supported through the adhesive tape 13 by the frame 15 is stored in the cassette 8. The workpiece 11 is not limited in material, shape, structure, size, etc. For example, the workpiece 11 may be a wafer formed of any semiconductors other than silicon. Further, the wafer may be formed of any other materials such as ceramic, resin, and metal. Further, the devices formed on the workpiece 11 is not limited in kind, number, shape, structure, size, layout, etc. Further, the workpiece 11 may have no devices. Further, the workpiece 11 may not be supported by the frame 15. Further, the adhesive tape 13 may not be attached to the workpiece 11.

A rectangular opening 4b is formed on the upper surface of the base housing 4 on the right side of the rectangular opening 4a. The rectangular opening 4b is elongated in the X direction (longitudinal direction or work feeding direction) depicted by an arrow X. There are provided inside the rectangular opening 4b a ball screw type moving mechanism 10 and a dust-proof cover 12 for partially covering the upper side of the moving mechanism 10. The moving mechanism 10 includes a ball screw mechanism (not depicted) and a movable table 10a adapted to be moved in the X direction by the ball screw mechanism.

A chuck table (holding table) 14 for holding the workpiece 11 is provided on the movable table 10a. The chuck table 14 is connected to a rotational drive source (not depicted) such as a motor, so that the chuck table 14 is rotatable about a vertical axis extending in the Z direction (vertical direction or cutter feeding direction) depicted by an arrow Z. The chuck table 14 is movable in the X direction by operation of the moving mechanism 10 (work feeding operation). The chuck table 14 has an upper surface as a holding surface 14a for holding the workpiece 11. The holding surface 14a is connected through a suction passage (not depicted) to a vacuum source (not depicted). This suction passage is formed inside the chuck table 14. A plurality of clamps 16 for clamping the frame 15 supporting the workpiece 11 are provided on the outer circumference of the chuck table 14. The frame 15 is clamped so as to be held by the clamps 16.

A pair of parallel guide rails 18 is provided above the opening 4b so as to extend in the Y direction (lateral direction or indexing direction) depicted by an arrow Y. The guide rails 18 are movable toward and away from each other in the X direction. Each guide rail 18 has an L-shaped cross section in such a manner as to have a horizontal surface for supporting the frame 15 thereon and a vertical surface perpendicular to the horizontal surface. The guide rails 18 are arranged in such a manner that the respective vertical surfaces are opposed to each other in the X direction. The guide rails 18 correspond to a temporary setting area for temporarily setting the workpiece 11 and functions to support the frame 15 supporting the workpiece 11 in such a manner that the outer circumference of the frame 15 is brought into contact with the vertical surfaces of the guide rails 18 in the X direction. Thus, the workpiece 11 supported by the frame 15 is set in a given position by the guide rails 18 (positioning operation).

A double column type first support structure 20 is provided on the upper surface of the base housing 4 so as to straddle the opening 4b. A rail 22 is fixed to the front surface of the first support structure 20 (on the side where the guide rails 18 are present) so as to extend in the Y direction. A holding unit 26 is connected through a moving mechanism 24 to the rail 22.

The holding unit 26 is adapted to come into contact with the upper surface of the frame 15 and to thereby hold the frame 15 under suction. The moving mechanism 24 functions to vertically move the holding unit 26 and to also move the holding unit 26 in the Y direction along the rail 22. The holding unit 26 functions to hold the frame 15 under suction in the condition where the workpiece 11 supported by the frame 15 is positioned by the guide rails 18 and to next transfer the workpiece 11 to the chuck table 14. The holding unit 26 has a handling mechanism 26a for handling the frame 15 supporting the workpiece 11. The handling mechanism 26a is provided at the left end of the holding unit 26 (on the side where the opening 4a is present). The handling mechanism 26a is so configured as to hold (grasp) the frame 15. That is, the frame 15 supporting the workpiece 11 stored in the cassette 8 is held by the handling mechanism 26a, and the holding unit 26 is next moved in the Y direction to thereby transfer the workpiece 11 from the cassette 8 to the guide rails 18 before cutting. Conversely, the frame 15 supporting the workpiece 11 set on the guide rails 18 is held by the handling mechanism 26a, and the holding unit 26 is next moved in the Y direction to thereby transfer the workpiece 11 from the guide rails 18 to the cassette 8 after cutting.

Further, a rail 28 is fixed to the front surface of the first support structure 20 so as to extend in the Y direction. A holding unit 32 is connected through a moving mechanism 30 to the rail 28. The holding unit 32 is adapted to come into contact with the upper surface of the frame 15 and to thereby hold the frame 15 under suction. The moving mechanism 30 functions to vertically move the holding unit 32 and to also move the holding unit 32 in the Y direction along the rail 28.

A double column type second support structure 34 is provided on the upper surface of the base housing 4 behind the first support structure 20 so as to straddle the opening 4b. A pair of moving mechanisms 36a and 36b is fixed to the front surface of the second support structure 34 (on the side where the first support structure 20 is present) at a pair of column portions thereof. A cutting unit 38a (first cutting unit) is provided at the lower end of the moving mechanism 36a, and a cutting unit 38b (second cutting unit) is provided at the lower end of the moving mechanism 36b. The moving mechanism 36a functions to move the cutting unit 38a in the Y direction and the Z direction, thereby adjusting the Y position and the Z position of the cutting unit 38a in the Y direction and the Z direction, respectively. Similarly, the moving mechanism 36b functions to move the cutting unit 38b in the Y direction and the Z direction, thereby adjusting the Y position and the Z position of the cutting unit 38b in the Y direction and the Z direction, respectively.

Figure 2:
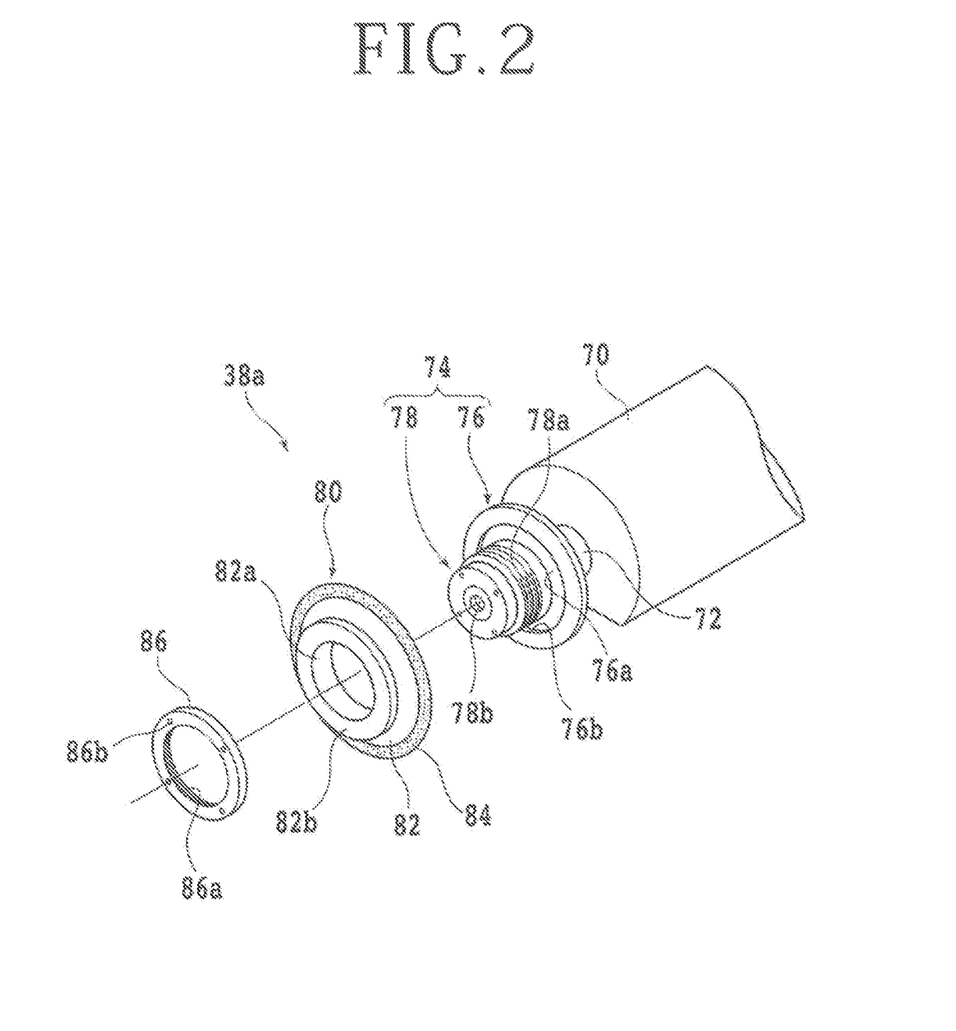
FIG. 2 is a perspective view depicting a cutting unit.

FIG. 2 is a perspective view depicting the cutting unit 38a. As depicted in FIG. 2, the cutting unit 38a includes a hollow cylindrical housing 70. A solid cylindrical spindle (rotating shaft) 72 is rotatably supported in the housing 70. A front end portion (one end portion) of the spindle 72 projects from the housing 70 so as to be exposed. A mount 74 is fixed to this front end portion of the spindle 72. The mount 74 is circular as viewed in side elevation. A rotational drive source (not depicted) such as a motor is connected to a base end portion (the other end portion) of the spindle 72, so as to rotate the spindle 72.

The mount 74 includes a disk-shaped flange portion 76 and a solid cylindrical support shaft 78 projecting from the front surface 76a of the flange portion 76 at a central portion thereof. An annular projection 76b is formed on the front surface 76a of the flange portion 76 at a peripheral portion thereof. The front end portion of the projection 76b is substantially parallel to the front surface 76a of the flange portion 76. A threaded portion 78a is formed on the outer circumferential surface of the support shaft 78. A recess 78b is formed on the front end surface of the support shaft 78 at a central portion thereof. An annular cutting blade 80 for cutting the workpiece 11 is mounted on the support shaft 78 of the mount 74.

The cutting blade 80 includes an annular base 82 and an annular cutting edge 84 formed along the outer circumference of the base 82. The base 82 has a circular central hole 82a. An annular projection 82b is formed around the opening 82a of the base 82 so as to project from the front surface of the base 82. The projection 82b of the base 82 functions as a grip portion to be gripped in mounting or demounting the cutting blade 80 as will be described below. The cutting edge 84 is formed by binding abrasive grains such as diamond abrasive grains with a nickel plating layer as a bond. However, the abrasive grains and the bond for forming the cutting edge 84 are not limited and may suitably be selected according to the material of the workpiece 11 and details on the cutting, for example.

An annular nut 86 for fastening the cutting blade 80 is tightened to the threaded portion 78a of the support shaft 78. The nut 86 has a circular central opening 86a having a diameter corresponding to the diameter of the support shaft 78. The opening 86a of the nut 86 has an internal thread corresponding to the threaded portion 78a of the support shaft 78. That is, the internal thread of the opening 86a of the nut 86 is adapted to engage the threaded portion 78a of the support shaft 78. Further, the nut 86 has a plurality of through holes 86b (e.g., four through holes as depicted) extending in the axial direction of the nut 86 (along the thickness of the nut 86). The through holes 86b are arranged at substantially equal intervals along the outer circumference of the nut 86.

The cutting blade 80 is mounted to the spindle 72 in the following manner. The cutting blade 80 is first mounted on the mount 74 in such a manner that the support shaft 78 of the mount 74 is inserted through the opening 82a of the base 82 of the cutting blade 80. Thereafter, the nut 86 is threadedly engaged with the threaded portion 78a of the support shaft 78 until the nut 86 is tightened. Accordingly, the base 82 of the cutting blade 80 is securely held between the nut 86 and the front end surface of the projection 76b of the flange portion 76 of the mount 74. In this manner, the cutting blade 80 is mounted to the front end portion of the spindle 72.

While the cutting 38a has been described with reference to FIG. 2, the configuration of the cutting unit 38b is similar to that of the cutting unit 38a. The cutting blade 80 mounted in the cutting unit 38a and the cutting blade 80 mounted in the cutting unit 38b are opposed to each other in the Y direction. Although not depicted, each of the cutting units 38a and 38b is provided with a nozzle for supplying a cutting fluid such as pure water to the workpiece 11 and the cutting blade 80.

As depicted in FIG. 1, an imaging unit (camera) 40 for imaging the workpiece 11 held on the chuck table 14 is provided adjacent to the cutting unit 38a. Similarly, another imaging unit 40 is provided adjacent to the cutting unit 38b. An image obtained by the imaging unit 40 for the cutting unit 38a is used in alignment between the workpiece 11 held on the chuck table 14 and the cutting unit 38a. Similarly, an image obtained by the imaging unit 40 for the cutting unit 38b is used in alignment between the workpiece 11 and the cutting unit 38b.

The workpiece 11 is cut by operating the cutting units 38a and 38b in the following manner. The workpiece 11 is placed through the adhesive tape 13 on the chuck table 14, and the frame 15 is fixed by the clamps 16. In this condition, a vacuum produced by the vacuum source is applied to the holding surface 14a of the chuck table 14 to thereby hold under suction the workpiece 11 through the adhesive tape 13 on the holding surface 14a. Thereafter, each cutting blade 80 is rotated and fed to cut the workpiece 11 as the cutting fluid is supplied toward the workpiece 11. In this manner, the workpiece 11 is cut by each cutting blade 80.

A cleaning unit 42 for cleaning the workpiece 11 cut by each cutting blade 80 is provided on the right side of the opening 4b (on the side opposite to the opening 4a). The cleaning unit 42 includes a spinner table 44 for holding the workpiece 11 in a cylindrical cleaning space defined in the base housing 4. A rotational drive source (not depicted) is connected to the lower end of the spinner table 44, so as to rotate the spinner table 44 at a predetermined speed. A nozzle 46 for spraying a cleaning fluid toward the workpiece 11 held on the spinner table 44 is provided above the spinner table 44. For example, the cleaning fluid is a mixture fluid obtained by mixing water and air. The workpiece 11 is cleaned by operating the cleaning unit 42 in the following manner. The workpiece 11 is first held on the spinner table 44 under suction, and fluid is sprayed from the nozzle 46 toward the workpiece 11 to thereby clean the workpiece 11.

In this manner, the workpiece 11 cut by the cutting units 38a and 38b is transferred to the cleaning unit 42 by operation of the holding unit 32 and then cleaned by the cleaning unit 42. Thereafter, the workpiece 11 is held by the holding unit 26 under suction and transferred to the guide rails 18. After positioning the workpiece 11 by operating the guide rails 18, the frame 15 supporting the workpiece 11 is grasped by the handling mechanism 26a of the holding unit 26 and then the workpiece 11 is stored into the cassette 8 by operation of the holding unit 26.

A blade changing apparatus (blade changing mechanism) 50 is provided on the back side of the second support structure 34 (on the side opposite to the side where the first support structure 20 is provided). The blade changing apparatus 50 functions to change the cutting blade 80 mounted on the spindle 72 (see FIG. 2) of the cutting unit 38a and to also change the cutting blade 80 mounted on the spindle 72 of the cutting unit 38b. The blade changing apparatus 50 includes a pair of blade racks 52a and 52b for supporting and storing a plurality of cutting blades 80. The blade racks 52a and 52b are opposed to each other in the Y direction.

The blade rack 52a includes a cylindrical support shaft 54a extending in the Y direction and a disk-shaped member 56a fixed to the front end of the support shaft 54a. Similarly, the blade rack 52b includes a cylindrical support shaft 54b extending in the Y direction and a disk-shaped member 56b fixed to the front end of the support shaft 54b. The support shaft 54a is connected to a rotational drive source (not depicted) such as a motor, so that the support shaft 54a is rotatable about its horizontal axis extending in the Y direction. Similarly, the support shaft 54b is connected to a rotational drive source (not depicted) such as a motor, so that the support shaft 54b is rotatable about its horizontal axis extending in the Y direction. A plurality of cutting blades 80 are stored on the front side of the disk-shaped member 56a (on the side where the blade rack 52b is present), and a plurality of cutting blades 80 are similarly stored on the front side of the disk-shaped member 56b (on the side where the blade rack 52a is present). For example, in FIG. 1, six cutting blades 80 are stored on the disk-shaped member 56a so as to be arranged at substantially equal intervals along the outer circumference of the disk-shaped member 56a. Similarly, six cutting blades 80 are stored on the disk-shaped member 56b so as to be arranged at substantially equal intervals along the outer circumference of the disk-shaped member 56b. The plural cutting blades 80 stored on the disk-shaped member 56a are respectively opposed to the plural cutting blades 80 stored on the disk-shaped member 56a.

A plate-shaped base 58 is provided in an area defined between the blade racks 52a and 52b. The base 58 is fixed to a fixing member (not depicted) provided behind the second support structure 34. The base 58 is substantially parallel to a horizontal plane (i.e., XY plane defined by the X direction and the Y direction). A moving mechanism 60 is fixed to the lower surface of the base 58.

The moving mechanism 60 includes a ball screw 62 rotatably supported to the lower surface of the base 58. A movable member 64 is threadedly engaged with the ball screw 62. The movable member 64 has a shape like a rectangular prism. A support member 66 is fixed to the lower surface of the movable member 64. The support member 66 has a substantially C-shaped configuration as viewed in side elevation. The support member 66 functions to support a mounting and demounting unit (mounting and demounting mechanism) 68 for mounting and demounting the cutting blade 80 and the nut 86 (see FIG. 2). A pulse motor (not depicted) for rotating the ball screw 62 is connected to one end of the ball screw 62. When the ball screw 62 is rotated by this pulse motor, the movable member 64 is moved in the X direction and the mounting and demounting unit 68 supported by the support member 66 fixed to the movable member 64 is accordingly moved in the X direction along the ball screw 62. With this configuration, the X position of the mounting and demounting unit 68 in the X direction can be controlled.

Figure 3:
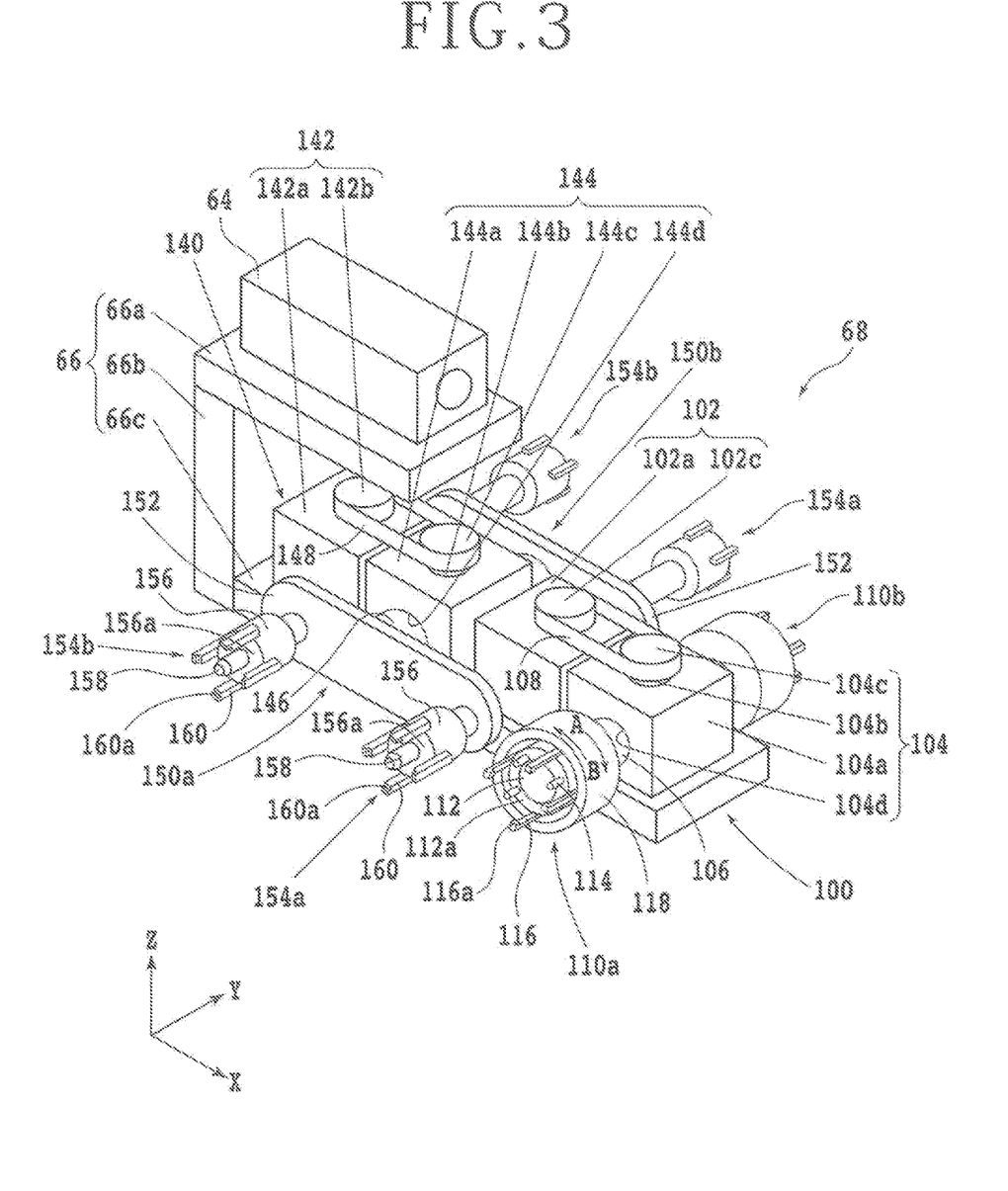
FIG. 3 is a perspective view depicting a mounting and demounting unit.

FIG. 3 is a perspective view depicting the mounting and demounting unit 68. The support member 66 supporting the mounting and demounting unit 68 includes a plate-shaped upper wall portion 66a fixed to the lower surface of the movable member 64 so as to horizontally extend in the X direction, a plate-shaped side wall portion 66b vertically projecting downward from the lower surface of the upper wall portion 66a at its rear end portion, and a plate-shaped support portion 66c horizontally projecting from the front surface of the side wall portion 66b at its lower end portion. That is, the support portion 66c is substantially parallel to the upper wall portion 66a. The mounting and demounting unit 68 is supported by the support portion 66c of the support member 66.

The mounting and demounting unit 68 includes a nut mounting and demounting unit 100 for mounting and demounting the nut 86 (see FIG. 2) for fastening the cutting blade 80 to the spindle 72 and a blade mounting and demounting unit 140 for mounting the cutting blade 80 (new one) to the spindle 72 and demounting the cutting blade 80 (old one) from the spindle 72. Both the nut mounting and demounting unit 100 and the blade mounting and demounting unit 140 are fixed to the upper surface of the support portion 66c of the support member 66.

The nut mounting and demounting unit 100 includes a motor 102 as a rotational drive source and a power transmitting unit (power transmitting mechanism) 104 connected to the motor 102. The motor 102 and the power transmitting unit 104 are juxtaposed to each other in the X direction. The motor 102 includes a hollow cubic housing 102a for storing components such as a rotor and a stator and a rotating shaft (output shaft) 102b (see FIG. 4) connected to the rotor so as to extend in the Z direction. An upper end portion of the rotating shaft 102b projects from the upper surface of the housing 102a, and a disk-shaped pulley member (drive wheel) 102c is fixed to this upper end portion of the rotating shaft 102b. When electric power is supplied to the motor 102, the rotating shaft 102b and the pulley member 102c are rotated together about a vertical axis extending in the Z direction.

The power transmitting unit 104 includes a hollow cubic housing 104a and a rotating shaft 104b stored in the housing 104a so as to extend in the Z direction. An upper end portion of the rotating shaft 104b projects from the upper surface of the housing 104a, and a disk-shaped pulley member (driven wheel) 104c is fixed to this upper end portion of the rotating shaft 104b. The housing 104a has a central through hole 104d extending in the Y direction, and a rotating shaft 106 is inserted through the through hole 104d of the housing 104a. That is, opposite end portions of the rotating shaft 106 project from the right and left side surfaces of the housing 104a. The rotating shaft 106 depicted in FIG. 3 is configured of a single cylindrical shaft. The rotating shaft 106 is supported by the housing 104a so as to be rotatable about a horizontal axis extending in the Y direction. The rotating shaft 106 is connected to the rotating shaft 104b in the housing 104a. A connecting mechanism for connecting the rotating shaft 104b and the rotating shaft 106 will be described in detail below.

The motor 102 and the power transmitting unit 104 are connected to each other by an endless connecting member 108 such as a belt and a chain. The connecting member 108 is wrapped between the pulley member 102c of the motor 102 and the pulley member 104c of the power transmitting unit 104 in such a manner as to come into contact with the outer circumferential surface of the pulley member 102c and the outer circumferential surface of the pulley member 104c. That is, the connecting member 108 is wrapped between the pulley members 102c and 104c so as to form an oval shape as viewed in plan. Thus, the pulley member 102c, the pulley member 104c, and the connecting member 108 constitute a pulley mechanism. When electric power is supplied to the motor 102, the rotating shaft 102b of the motor 102 is rotated. Accordingly, a rotational drive force produced from the motor 102 is transmitted through the pulley member 102c, the connecting member 108, and the pulley member 104c to the rotating shaft 104b, so that the rotating shaft 104b is rotated about its vertical axis extending in the Z direction. Thereafter, the rotational force of the rotating shaft 104b is transmitted through gearing (to be described below) to the rotating shaft 106, so that the rotating shaft 106 is rotated about its horizontal axis extending in the Y direction. In this manner, the power of the motor 102 is transmitted to the rotating shaft 106 by the power transmitting unit 104.

A nut rotating portion (nut rotating unit) 110a is fixed to one end (left end) of the rotating shaft 106. The nut rotating portion 110a functions to hold and rotate the nut 86 (see FIG. 2) for fastening the cutting blade 80 to the spindle 72 of the cutting unit 38a. Similarly, a nut rotating portion (nut rotating unit) 110b is fixed to the other end (right end) of the rotating shaft 106. The nut rotating portion 110b functions to hold and rotate the nut 86 for fastening the cutting blade 80 to the spindle 72 of the cutting unit 38b. Accordingly, when the rotating shaft 106 is rotated, the nut rotating portions 110a and 110b are rotated about their respective horizontal axes extending in the Y direction together with the rotating shaft 106. The rotation axis of the nut rotating portion 110a is aligned with the rotation axis of the nut rotating portion 110b in the axial direction of the rotating shaft 106.

The nut rotating portions 110a and 110b each include a cylindrical rotating member 112 fixed to one end of the rotating shaft 106. The rotating member 112 is normally biased toward the side opposite to the power transmitting unit 104 by a spring or the like, and when an external force is applied to the rotating member 112 in its axial direction, the rotating member 112 is movable in the Y direction against a biasing force of the spring. The rotating member 112 has a front surface 112a oriented to the side opposite to the side where the power transmitting unit 104 is present.

The rotating member 112 has four holding pins 114 projecting from the front surface 112a. The four holding pins 114 are adapted to be inserted into the four through holes 86b of the nut 86 (see FIG. 2), respectively. That is, the four holding pins 114 are formed so as to correspond to the positions and sizes of the four through holes 86b. The four holding pins 114 have the same diameter, which is substantially equal to the diameter of each through hole 86b. While four holding pins 114 are formed in this preferred embodiment, a plurality of holding pins 114 respectively corresponding to the plural through holes 86b may be formed in the present invention; the number of the plural through holes 86b may suitably be set.

Further, a plurality of gripping members 116 for gripping the nut 86 are provided on the outer circumference of the rotating member 112 so as to be arranged at substantially equal intervals along the outer circumference of the rotating member 112. Each gripping member 116 is a bar-shaped member extending substantially along the rotating member 112, and a base end portion (one end) of each gripping member 116 is fixed to the outer circumferential surface of the rotating member 112. In the preferred embodiment depicted in FIG. 3, the four gripping members 116 are fixed to the rotating member 112. A front end portion (the other end) of each gripping member 116 projects from the front surface 112a of the rotating member 112, and a claw portion 116a is formed at this front end portion of each gripping member 116 so as to be bent toward the center line (axis) of the rotating member 112. Further, each gripping member 116 is normally biased outward in the radial direction of the rotating member 112 by a spring or the like, so that each claw portion 116a is movable in the radial direction of the rotating member 112.

A hollow cylindrical cover 118 is provided around the rotating member 112 so as to surround the outer circumferential surface of the rotating member 112. A part of the rotating member 112 and the base end portion of each gripping member 116 are stored in the cover 118. When the rotating member 112 is pushed toward the cover 118 in the axial direction by application of an external force, the rotating member 112 and the plural gripping members 116 are inserted into the cover 118 against the biasing force of the spring.

When the rotating member 112 is pushed into the cover 118 as mentioned above, the front end portion of each gripping member 116 comes into contact with the inner wall of the cover 118 so as to be urged by the inner wall of the cover 118 against the biasing force of the spring. Accordingly, the claw portion 116a formed at the front end portion of each gripping member 116 is moved inward in the radial direction of the rotating member 112. As a result, each gripping member 116 extends in the axial direction of the rotating member 112 along the inner wall of the cover 118 (closed condition). In this closed condition, the claw portion 116a of each gripping member 116 is positioned radially inside of the outer circumferential edge of the rotating member 112 in the radial direction of the rotating member 112. Conversely, when the external force applied to the rotating member 112 is removed, the rotating member 112 is axially moved out of the cover 118 by the biasing force of the spring, so that the depressed condition of the front end portion of each gripping member 116 by the inner wall of the cover 118 is canceled. As a result, the front end portion of each gripping member 116 is moved outward in the radial direction of the rotating member 112 by the biasing force of the spring. Accordingly, each gripping member 116 extends in a direction diverged from the axial direction of the rotating member 112 (open condition). In this open condition, the claw portion 116a of each gripping member 116 is positioned radially outside of the outer circumferential edge of the rotating member 112 in the radial direction of the rotating member 112. The other nut rotating portion 110b has the same configuration as that of the nut rotating portion 110a.

Each of the nut rotating portions 110a and 110b functions to hold and rotate the nut 86. The nut 86 is rotated by the nut rotating portion 110a in the manner described below. The operation of the nut rotating portion 110b is similar to the operation of the nut rotating portion 110a, and the description of the operation of the nut rotating portion 110b will therefore be omitted. First, the nut 86 is brought into contact with the front surface 112a of the rotating member 112 so that the plural holding pins 114 of the rotating member 112 can respectively be inserted into the plural through holes 86b (see FIG. 2) of the nut 86. Thereafter, the rotating member 112 is pushed into the cover 118, so that the plural gripping members 116 come into the closed condition and the claw portions 116a accordingly come into contact with the outer circumferential surface of the nut 86, thereby gripping the nut 86. In this condition where the nut 86 is held by the plural gripping members 116, the motor 102 is operated. As a result, the torque of the motor 102 is transmitted through the power transmitting unit 104 to the rotating shaft 106, thereby rotating the rotating shaft 106. Accordingly, the rotating member 112 fixed to the rotating shaft 106 is rotated, so that the nut 86 held by the gripping members 116 fixed to the rotating member 112 is rotated. In this manner, the nut 86 can be held and rotated by the nut rotating portion 110a. That is, in changing the cutting blade 80 mounted in the cutting unit 38a, the nut 86 can be mounted and demounted automatically by operation of the nut mounting and demounting unit 100. Similarly, the nut 86 can be held and rotated by the nut rotating portion 110b. Accordingly, in changing the cutting blade 80 mounted in the cutting unit 38b, the nut 86 can be mounted and demounted automatically by operation of the nut mounting and demounting unit 100. The specific operation of the nut mounting and demounting unit 100 in changing the cutting blade 80 will be described in detail below.

Figure 4:
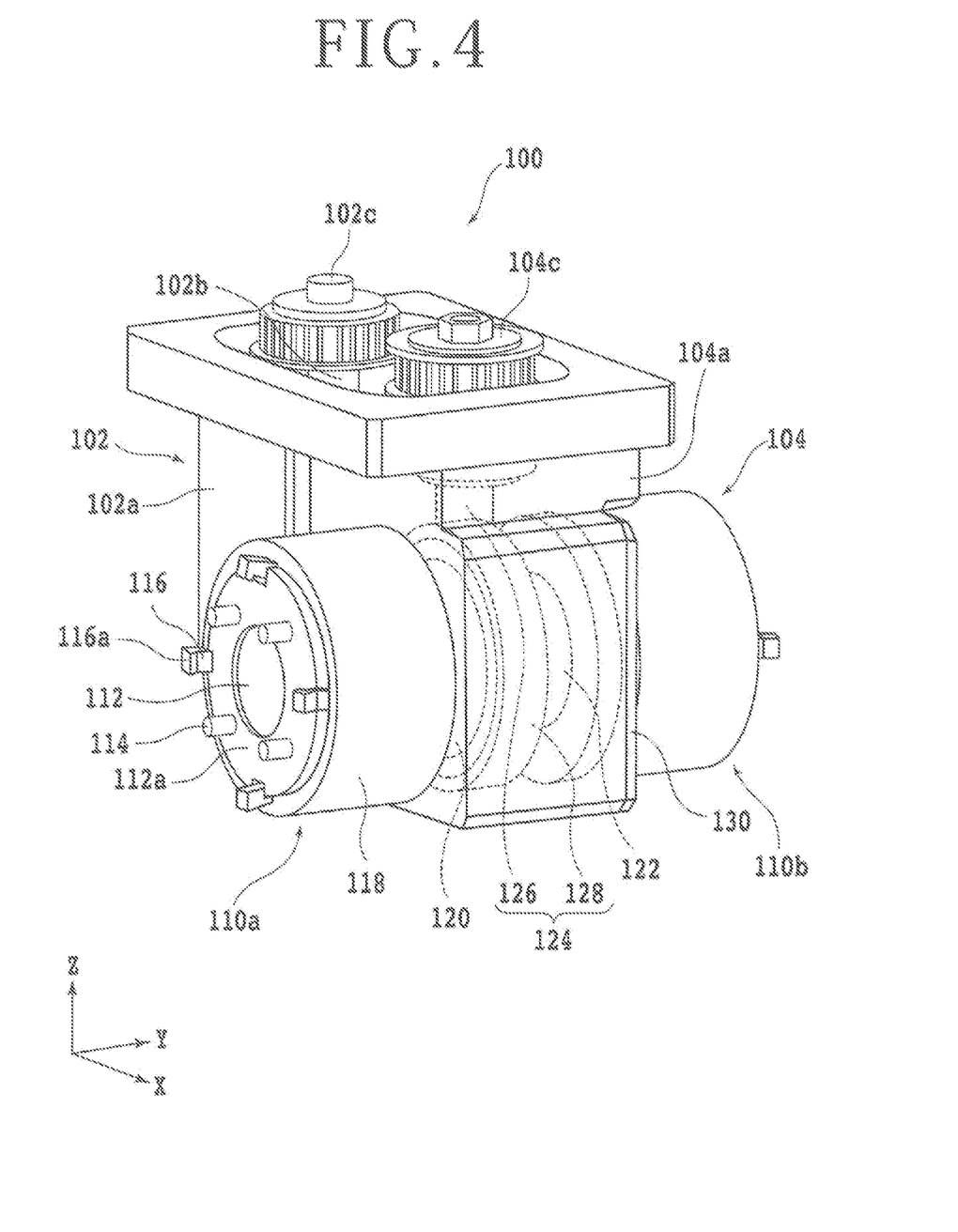
FIG. 4 is a perspective view depicting a power transmitting unit.
Figure 5:
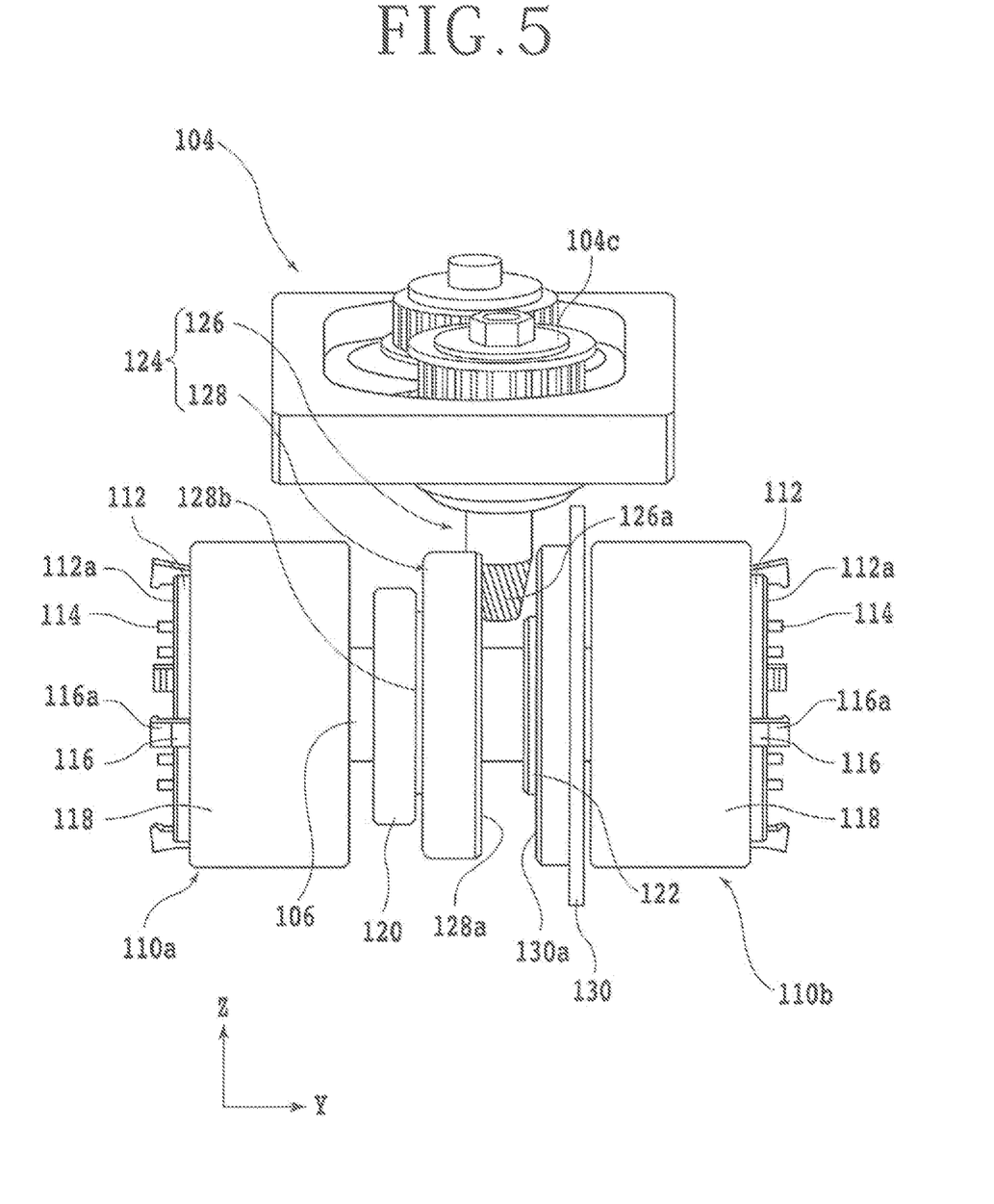
FIG. 5 is a perspective view depicting the inside of the power transmitting unit.

As mentioned above, the torque of the motor 102 is transmitted through the power transmitting unit 104 to the rotating shaft 106. More specifically, the power transmitting unit 104 includes a mechanism for transmitting the torque of the rotating shaft 104b to the rotating shaft 106 to thereby rotate the rotating shaft 106. FIG. 4 is a perspective view depicting the power transmitting unit 104, and FIG. 5 is a perspective view depicting the inside of the power transmitting unit 104. In FIG. 5, the housing 104a of the power transmitting unit 104 is not depicted.

As depicted in FIGS. 4 and 5, the power transmitting unit 104 includes an annular first bearing 120 and an annular second bearing 122 for rotatably supporting the rotating shaft 106 inside the housing 104a. The first bearing 120 is fixed so as to surround the rotating shaft 106 at a portion on the left side where the nut rotating portion 110a is present. The second bearing 122 is fixed so as to surround the rotating shaft 106 at a portion on the right side where the nut rotating portion 110b is present.

Further, the power transmitting unit 104 includes a gear unit 124 for converting the torque of the rotating shaft 104b into the torque of the rotating shaft 106. The gear unit 124 is composed of a first gear 126 fixed to the rotating shaft 104b and a second gear 128 fixed to the rotating shaft 106. Accordingly, the gear unit 124 is configured so as to convert the torque about the vertical axis into the torque about the horizontal axis. The first gear 126 is connected to the lower end of the rotating shaft 104b (see FIG. 3) so that the axis of rotation of the first gear 126 extends in the Z direction. A toothed portion 126a is formed at a lower end portion of the first gear 126. On the other hand, the second gear 128 has an annular shape and is fixed to the rotating shaft 106 so as to surround the same at a portion between the first bearing 120 and the second bearing 122. A toothed portion 128a is formed on one side surface of the second gear 128 opposed to the second bearing 122. The toothed portion 128a of the second gear 128 is in mesh with the toothed portion 126a of the first gear 126. The other side surface of the second gear 128 opposed to the first bearing 120 functions as a support surface 128b for supporting the first bearing 120.

The first gear 126 and the second gear 128 are arranged so that the toothed portion 126a is in mesh with the toothed portion 128a. The toothed portion 126a and the toothed portion 128a are configured so that when the first gear 126 having a rotation axis extending in the Z direction is rotated, the second gear 128 having a rotation axis extending in the Y direction is rotated by the rotation of the first gear 126. For example, the first gear 126 and the second gear 128 are configured by a bevel gear (e.g., a spiral bevel gear or a straight bevel gear) or a hypoid gear.

A cover 130 is provided on one side of the second bearing 122 where the nut rotating portion 110b is present. The cover 130 has a rectangular shape as viewed in side elevation. A part of the cover 130 is inserted in the housing 104a (see FIG. 4) to cover the side surface of the housing 104a opposed to the nut rotating portion 110b. The side surface of the cover 130 opposed to the second bearing 122 functions as a support surface 130a for supporting the second bearing 122.

The torque of the rotating shaft 104b is transmitted through the gear unit 124 to the rotating shaft 106 in the following manner. When the rotating shaft 104b of the power transmitting unit 104 is rotated by operating the motor 102 (see FIG. 3), the first gear 126 is rotated, so that the second gear 128 meshing with the first gear 126 is rotated about the axis extending in the Y direction. Accordingly, the rotating shaft 106 integrated with the second gear 128 is rotated about the axis extending in the Y direction, thereby rotating the nut rotating portions 110a and 110b. In this manner, the torque of the rotating shaft 104b is transmitted through the gear unit 124 to the rotating shaft 106.

In the case that the number of teeth of the second gear 128 is greater than the number of teeth of the first gear 126, the rotational speed of the rotating shaft 106 becomes smaller than the rotational speed of the motor 102 (i.e., the rotational speed of the rotating shaft 102b and the rotating shaft 104b) in transmitting the torque of the motor 102 to the rotating shaft 106. In other words, the power transmitting unit 104 functions as a speed reducer in this case. In this case, the torque of each of the nut rotating portion 110a and the nut rotating portion 110b can be made larger than the torque of the motor 102.

As depicted in FIG. 3, the blade mounting and demounting unit 140 is provided behind the nut mounting and demounting unit 100. The blade mounting and demounting unit 140 includes a motor 142 and a power transmitting unit (power transmitting mechanism) 144 connected to the motor 142. The motor 142 and the power transmitting unit 144 are juxtaposed to each other in the X direction.

The motor 142 includes a hollow cubic housing 142a and a rotating shaft (not depicted) rotatably supported in the housing 142a so as to extend in the Z direction. An upper end portion of this rotating shaft projects from the upper surface of the housing 142a, and a disk-shaped pulley member (drive wheel) 142b is fixed to this upper end portion of the rotating shaft. Accordingly, when electric power is supplied to the motor 142, the rotating shaft of the motor 142 and the pulley member 142b are rotated together about a vertical axis extending in the Z direction. The configuration of the motor 142 may be made similar to the configuration of the motor 102 of the nut mounting and demounting unit 100.

The power transmitting unit 144 includes a hollow cubic housing 144a and a rotating shaft 144b rotatably supported in the housing 144a so as to extend in the Z direction. An upper end portion of the rotating shaft 144b projects from the upper surface of the housing 144a, and a disk-shaped pulley member (driven wheel) 144c is fixed to this upper end portion of the rotating shaft 144b. The housing 144a has a central through hole 144d extending in the Y direction. A rotating shaft 146 is inserted through the through hole 144d of the housing 144a, and opposite end portions of the rotating shaft 146 project from the right and left side surfaces of the housing 144a. The configuration of the power transmitting unit 144 may be made similar to the configuration of the power transmitting unit 104 of the nut mounting and demounting unit 100. Further, the configuration of the rotating shaft 146 may be made similar to the configuration of the rotating shaft 106 of the nut mounting and demounting unit 100.

The motor 142 and the power transmitting unit 144 are connected to each other by an endless connecting member 148 such as a belt and a chain. A connecting method for connecting the motor 142 and the power transmitting unit 144 is similar to that for connecting the motor 102 and the power transmitting unit 104 in the nut mounting and demounting unit 100.

A blade holding unit 150a is fixed to one end (left end) of the rotating shaft 146. The blade holding unit 150a functions to mount the cutting blade 80 (new one) to the cutting unit 38a (see FIG. 1) and to also demount the cutting blade 80 (old one) from the cutting unit 38a. Similarly, a blade holding unit 150b is fixed to the other end (right end) of the rotating shaft 146. The blade holding unit 150b functions to mount the cutting blade 80 (new one) to the cutting unit 38b (see FIG. 1) and to also demount the cutting blade 80 (old one) from the cutting unit 38b. The blade holding unit 150a includes a plate-shaped support member 152 having an oval shape as viewed in side elevation and a pair of blade gripping units 154a and 154b fixed to one side surface of the support member 152 on the side opposite to the power transmitting unit 144. The blade gripping unit 154a is fixed to one end portion of the support member 152, and the blade gripping unit 154b is fixed to the other end portion of the support member 152. The other blade holding unit 150b has the same configuration as that of the blade holding unit 150a.

The blade gripping units 154a and 154b each include a cylindrical base 156 fixed to the support member 152. The cylindrical base 156 has a front surface 156a oriented to the side opposite to the power transmitting unit 144. A positioning pin 158 projects from the front surface 156a of the base 156 at the center thereof. The positioning pin 158 has a front end portion adapted to be inserted into the recess 78b formed on the support shaft 78 of the mount 74 (see FIG. 2). That is, the front end portion of the positioning pin 158 is formed so as to correspond to the position and size of the recess 78b.

A plurality of gripping members 160 for gripping the projection 82b (see FIG. 2) of the cutting blade 80 is provided on the outer circumference of the base 156 so as to be arranged at substantially equal intervals along the outer circumference of the base 156. Each gripping member 160 is a bar-shaped member extending along the base 156, and a base end portion (one end) of each gripping member 160 is fixed to the outer circumferential surface of the base 156. In the preferred embodiment depicted in FIG. 3, the four gripping members 160 are fixed to the base 156. A front end portion (the other end) of each gripping member 160 projects from the front surface 156a of the base 156, and a claw portion 160a is formed at this front end portion of each gripping member 160 so as to be bent toward the center line (axis) of the base 156. A moving mechanism (not depicted) for moving the front end portion of each gripping member 160 in the radial direction of the base 156 is stored in the base 156. This moving mechanism functions to selectively take an operative condition in which the claw portion 160a of each gripping member 160 comes into contact with the outer circumferential surface of the projection 82b (see FIG. 2) of the cutting blade 80 to thereby grip the cutting blade 80 (closed condition) and an inoperative condition in which the claw portion 160a is moved radially outward of the base 156 from the above closed condition to thereby cancel the gripped condition of the cutting blade 80 (open condition). The other blade gripping unit 154b has the same configuration as that of the blade gripping unit 154a.

The blade holding unit 150a functions to hold the cutting blade 80 (old one) mounted on the cutting unit 38a and to also hold the cutting blade 80 (new one) stored on the blade rack 52a (see FIG. 1). Similarly, the blade holding unit 150b functions to hold the cutting blade 80 (old one) mounted on the cutting unit 38b and to also hold the cutting blade 80 (new one) stored on the blade rack 52b (see FIG. 1). That is, in changing the cutting blade 80 mounted on the cutting unit 38a, the blade holding unit 150a is operated to replace the cutting blade 80 (old one) mounted on the cutting unit 38a with the cutting blade 80 (new one) stored on the blade rack 52a. Similarly, in changing the cutting blade 80 mounted on the cutting unit 38b, the blade holding unit 150b is operated to replace the cutting blade 80 (old one) mounted on the cutting unit 38b with the cutting blade 80 (new one) stored on the blade rack 52b. A specific operation of the blade holding units 150a and 150b in changing the cutting blade 80 will be described in detail below.

As depicted in FIG. 1, the cutting apparatus 2 further includes a control portion (control unit) 90 for controlling each component constituting the cutting apparatus 2. The plural components (e.g., the moving mechanism 10, the chuck table 14, the moving mechanism 24, the holding unit 26, the moving mechanism 30, the holding unit 32, the moving mechanisms 36a and 36b, the cutting units 38a and 38b, the imaging units 40, the cleaning unit 42, and the blade changing apparatus 50) constituting the cutting apparatus 2 are connected to the control portion 90, and the operation of each component is controlled by the control portion 90. For example, the control portion 90 is configured by a computer including a processing unit such as a central processing unit (CPU) and a storing unit such as a flash memory. The processing unit is operated according to software stored in the storing unit, thereby realizing the control of each component by the control portion 90.

By using the blade changing apparatus 50 included in the cutting apparatus 2, the cutting blades 80 mounted on the cutting units 38*a* and 38*b* can be changed automatically. There will now be described the operation of the blade changing apparatus 50 in changing the cutting blades 80 mounted on the cutting units 38*a* and 38*b*. For convenience of illustration, the operation in changing the cutting blade 80 mounted on the cutting unit 38*a* will be described.

First, the moving mechanism 60 is operated to move the mounting and demounting unit 68 in the X direction so that the blade gripping unit 154*b* of the blade holding unit 150*a* (see FIG. 3) is opposed to a target one of the plural cutting blades 80 (new ones) stored on the blade rack 52*a*. At this time, by rotating the support shaft 54*a* of the blade rack 52*a* to thereby rotate the disk-shaped member 56*a*, the target cutting blade 80 to be opposed to the blade gripping unit 154*b* can be changed. Thereafter, the moving mechanism (not depicted) connected to the blade rack 52*a* is operated to move the blade rack 52*a* in the Y direction so that the target cutting blade 80 opposed to the blade gripping unit 154*b* approaches the blade gripping unit 154*b*. At this time, the plural gripping members 160 of the blade gripping unit 154*b* are kept in the open condition. Thereafter, the projection 82*b* of the target cutting blade 80 held on the blade rack 52*a* is positioned inside the plural gripping members 160. Thereafter, the plural gripping members 160 are moved radially inward to come into the closed condition. Accordingly, the target cutting blade 80 held on the blade rack 52*a* is gripped by the blade gripping unit 154*b*. Thereafter, the blade rack 52*a* is moved in the Y direction away from the blade gripping unit 154*b*.

Thereafter, the moving mechanism 60 is operated to move the mounting and demounting unit 68 in the X direction so that the mounting and demounting unit 68 is passed below the second support structure 34 and the first support structure 20 and then positioned so as to be opposed to the cutting unit 38*a*. In FIG. 1, the mounting and demounting unit 68 is depicted above and behind the first support structure 20 and the second support structure 34 for convenience of illustration. In reality, however, the mounting and demounting unit 68 is set at the same level as that of the cutting units 38*a* and 38*b* and is allowed to pass through the space defined below the first support structure 20 and the second support structure 34.

The mounting and demounting unit 68 is positioned so that the nut rotating portion 110*a* (see FIG. 3) is opposed to the cutting blade 80 (old one) mounted on the cutting unit 38*a*. The positional relation between the nut rotating portion 110*a* and the cutting unit 38*a* can be adjusted by the moving mechanism 36*a* and the moving mechanism 60. Thereafter, the moving mechanism 36*a* is operated to move the cutting unit 38*a* toward the nut rotating portion 110*a*. Accordingly, the nut 86 (see FIG. 2) fastening the cutting blade 80 mounted on the cutting unit 38*a* is moved to push the front surface 112*a* of the rotating member 112 (see FIG. 3) of the nut rotating portion 110*a*. At this time, the plural holding pins 114 of the nut rotating portion 110*a* are inserted into the through holes 86*b* (see FIG. 2) of the nut 86. When the rotating member 112 is axially pushed by the nut 86, the rotating member 112 is inserted into the cover 118, so that the plural gripping members 116 (see FIG. 3) of the rotating member 112 come into the closed condition. As a result, the nut 86 is gripped by the claw portions 116*a* of the plural gripping members 116.

Thereafter, the motor 102 (see FIG. 3) is operated to rotate the rotating shaft 106 and to thereby rotate the nut rotating portion 110*a* in a first direction (e.g., the direction depicted by an arrow A in FIG. 3). As a result, the nut 86 gripped by the nut rotating portion 110*a* is rotated to be loosened. Then, the nut 86 is removed from the support shaft 78 of the mount 74 (see FIG. 2). Thereafter, the cutting unit 38*a* is moved in the Y direction away from the nut rotating portion 110*a*. At this time, the rotating member 112 remains inserted in the cover 118, so that the nut 86 remains held by the nut rotating portion 110*a* even after removing the nut 86 from the support shaft 78.

Thereafter, the moving mechanism 60 is operated to move the mounting and demounting unit 68 in the X direction so that the blade gripping unit 154*a* of the blade holding unit 150*a* (see FIG. 3) is opposed to the cutting blade 80 (old one) mounted on the cutting unit 38*a*. Thereafter, the moving mechanism 36*a* is operated to move the cutting unit 38*a* toward the blade gripping unit 154*a* so that the cutting blade 80 mounted on the cutting unit 38*a* approaches the blade gripping unit 154*a*. At this time, the plural gripping members 160 of the blade gripping unit 154*a* are kept in the open condition. Further, the positioning pin 158 of the blade gripping unit 154*a* is inserted into the recess 78*b* of the support shaft 78 of the mount 74 (see FIG. 2). Accordingly, the blade gripping unit 154*a* is axially aligned with the cutting blade 80 mounted on the support shaft 78 of the mount 74. In this condition, the projection 82*b* (see FIG. 2) of the cutting blade 80 is positioned radially inside of the plural gripping members 160. Thereafter, the plural gripping members 160 are moved radially inward to come into the closed condition. As a result, the projection 82*b* of the cutting blade 80 mounted on the cutting unit 38*a* is gripped by the claw portions 160*a* of the plural gripping members 160. Thereafter, the cutting unit 38*a* is moved in the Y direction away from the blade gripping unit 154*a*. Accordingly, the cutting blade 80 (old one) is removed from the cutting unit 38*a* and held by the blade gripping unit 154*a*.

Thereafter, the motor 142 (see FIG. 3) is operated to rotate the rotating shaft 146 by 180 degrees. Accordingly, the support member 152 is rotated by 180 degrees to thereby change the position of the blade gripping unit 154*a* into the position of the blade gripping unit 154*b*, and vice versa. That is, the blade gripping unit 154*b* holding the target cutting blade 80 (new one) is now positioned so as to be opposed to the cutting unit 38*a*.

Thereafter, the moving mechanism 36*a* is operated to move the cutting unit 38*a* in the Y direction toward the blade gripping unit 154*b* so that the cutting unit 38*a* approaches the blade gripping unit 154*b*. Accordingly, the support shaft 78 of the mount 74 is inserted through the opening 82*a* (see FIG. 2) of the target cutting blade 80 held by the blade gripping unit 154*b*. Thereafter, the plural gripping members 160 of the blade gripping unit 154*b* are moved radially outward to come into the open condition. Accordingly, the target cutting blade 80 is mounted on the support shaft 78 of the mount 74 fixed to the front end portion of the spindle 72. Thereafter, the cutting unit 38*a* is moved in the Y direction away from the blade gripping unit 154*b*.

Thereafter, the moving mechanism 60 is operated to move the mounting and demounting unit 68 in the X direction so that the nut rotating portion 110*a* (see FIG. 3) holding the nut 86 (see FIG. 2) is opposed to the target cutting blade 80 mounted on the cutting unit 38*a*. Thereafter, the moving mechanism 36*a* is operated to move the cutting unit 38*a* in the Y direction toward the nut rotating portion 110*a*. Accordingly, the nut 86 held by the nut rotating portion 110*a* is positioned at the front end of the support shaft 78 of the mount 74 (see FIG. 2). Thereafter, the motor 102 (see FIG. 3) is operated to rotate the rotating shaft 106 and to thereby rotate the nut rotating portion 110a in a second direction (e.g., the direction depicted by an arrow B in FIG. 3) opposite to the first direction. Accordingly, the nut 86 is rotated in the second direction to be tightened on the threaded portion 78a of the support shaft 78 of the mount 74 (see FIG. 2). As a result, the target cutting blade 80 is held between the projection 76b of the mount 74 and the nut 86 and accordingly, fastened to the spindle 72 of the cutting unit 38a.

As described above, the gear unit 124 (see FIGS. 4 and 5) includes the first gear 126 and the second gear 128. In this case, by making the number of teeth of the second gear 128 greater than the number of teeth of the first gear 126, a speed reducer is obtained by the gear unit 124. In the case of using the power transmitting unit 104 including the gear unit 124 as a speed reducer, the torque of the nut rotating portion 110a can be increased. Accordingly, in rotating the nut rotating portion 110a to tighten the nut 86 (see FIG. 2) on the threaded portion 78a of the mount 74, the nut 86 can be tightened more securely.

Thereafter, the cutting unit 38a is moved in the Y direction away from the nut rotating portion 110a. At this time, the rotating member 112 is axially moved toward the outside of the cover 118, so that the plural gripping members 116 come into the open condition. Accordingly, the gripped condition of the nut 86 by the plural gripping members 116 is canceled. Thereafter, the moving mechanism 60 is operated to move the mounting and demounting unit 68 to the initial position (between the blade racks 52a and 52b). In this initial position, the cutting blade 80 (old one) held by the blade gripping unit 154a is recovered to the blade rack 52a. In this manner, the cutting blade 80 is automatically changed by the blade changing apparatus 50. That is, the old cutting blade 80 is automatically replaced by the new cutting blade 80 by the blade changing apparatus 50.

While the operation in changing the cutting blade 80 mounted on the cutting unit 38a has been described, the operation in changing the cutting blade 80 mounted on the cutting unit 38b is also similarly performed. In this case, the blade holding unit 150b is operated to change the cutting blade 80 (old one) mounted on the cutting unit 38b into the target cutting blade 80 (new one) stored on the blade rack 52b. Further, the nut rotating portion 110b is operated to mount and demount the nut 86 for fastening the cutting blade 80 to the cutting unit 38b. The operations of the cutting unit 38b, the nut rotating portion 110b, and the blade holding unit 150b in changing the cutting blade 80 mounted on the cutting unit 38b are similar to the operations of the cutting unit 38a, the nut rotating portion 110a, and the blade holding unit 150a, respectively.

As described above, the cutting apparatus 2 according to this preferred embodiment includes the blade changing apparatus 50 for changing the cutting blade 80. The blade changing apparatus 50 includes the motor 102, the rotating shaft 106, the nut rotating portion 110a fixed to one end of the rotating shaft 106, the nut rotating portion 110b fixed to the other end of the rotating shaft 106, and the power transmitting unit 104 for transmitting the power of the motor 102 to the rotating shaft 106. The blade changing apparatus 50 can transmit the power of the motor 102 through the power transmitting unit 104 and the rotating shaft 106 to the nut rotating portions 110a and 110b. That is, the two nut rotating portions 110a and 110b can be driven by the single motor 102. Accordingly, it is unnecessary to provide individual motors for the nut rotating portions 110a and 110b, so that the blade changing apparatus 50 can be reduced in size, weight, or cost.

The configuration of the blade changing apparatus 50 according to this preferred embodiment may suitably be modified within the scope where the cutting blade 80 can be changed. For example, the blade changing apparatus 50 may further include a moving mechanism for moving the mounting and demounting unit 68 in the Y direction and a moving mechanism for moving the mounting and demounting unit 68 in the Z direction. In this case, by using these moving mechanisms, the position of the mounting and demounting unit 68 can be controlled in changing the cutting blade 80.

While the blade changing apparatus 50 is located behind the second support structure 34 in this preferred embodiment, the location of the blade changing apparatus 50 is not limited. For example, the blade racks 52a and 52b and the mounting and demounting unit 68 may be located before or laterally of the first support structure 20. Further, the mechanism for controlling the movement of the mounting and demounting unit 68 is not limited. For example, a robot arm may be connected to the mounting and demounting unit 68 to control the movement of the mounting and demounting unit 68.

Further, the configuration of the blade racks 52a and 52b capable of storing the plural cutting blades 80 is not limited. For example, each of the blade racks 52a and 52b capable of storing the plural cutting blades 80 may be provided with a moving mechanism for moving a selected one of the plural cutting blades 80 to a position where the selected cutting blade 80 can be mounted to the mounting and demounting unit 68.

Further, the rotating shaft 106 (see FIG. 3) is a single shaft in this preferred embodiment. As a modification, the rotating shaft 106 may be composed of a first rotating shaft (first shaft) and a second rotating shaft (second shaft); the nut rotating portion 110a is fixed to the front end of the first rotating shaft and the nut rotating portion 110b is fixed to the front end of the second rotating shaft. In this case, the second gear 128 meshing with the first gear 126 is fixed to each of the first rotating shaft and the second rotating shaft. Further, the axis of the first rotating shaft is aligned with the axis of the second rotating shaft.

Any other structures and methods in this preferred embodiment may suitably be modified without departing from the scope of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:
1. A cutting apparatus comprising:
a chuck table for holding a workpiece;
a pair of first and second cutting units for cutting the workpiece held on the chuck table, each of the first and second cutting units including a spindle and a cutting blade mounted on the spindle; and
a blade changing apparatus for changing the cutting blade mounted on the spindle of the first cutting unit and changing the cutting blade mounted on the spindle of the second cutting unit,
the blade changing apparatus including:
a nut mounting and demounting unit for mounting and demounting a nut for fastening the cutting blade to the spindle in each of the first and second cutting units, and
a blade mounting and demounting unit for mounting the cutting blade to the spindle in each of the first and second cutting units and demounting the cutting blade from the spindle in each of the first and second cutting units, the nut mounting and demounting unit including:
- a rotating shaft,
- a first nut rotating portion fixed to one end of the rotating shaft for holding and rotating the nut for fastening the cutting blade to the spindle of the first cutting unit,
- a second nut rotating portion fixed to the other end of the rotating shaft for holding and rotating the nut for fastening the cutting blade to the spindle of the second cutting unit,
- a motor including an output shaft, and
- a power transmitting unit including a power rotating shaft, said power rotating shaft being coupled to said output shaft of the motor and the rotating shaft of the nut mounting and demounting unit for transmitting the power of the motor to the rotating shaft to thereby rotate the rotating shaft, wherein said power rotating shaft and said output shaft each have a longitudinal axis that is transverse to said rotational axis of said rotating shaft, said first nut rotating portion and said second nut rotating portion.

2. The cutting apparatus according to claim 1, wherein the axis of rotation of the first nut rotating portion is aligned with the axis of rotation of the second nut rotating portion.

3. The cutting apparatus according to claim 1, wherein the power transmitting unit includes a speed reducer for making the rotational speed of the rotating shaft smaller than the rotational speed of the motor and making the torque of each of the first nut rotating portion and the second nut rotating portion larger than the torque of the motor.

4. The cutting apparatus according to claim 3, wherein the speed reducer includes a bevel gear or a hypoid gear.

5. The cutting apparatus according to claim 1, further comprising another blade mounting and demounting unit for mounting the cutting blade to the spindle in each of the first and second cutting units and demounting the cutting blade from the spindle in each of the first and second cutting units.

6. The cutting apparatus according to claim 5, wherein said blade mounting and demounting unit and said another blade mounting and demounting unit are fixed to opposing ends of a blade rotating shaft.

7. The cutting apparatus according to claim 6, further comprising a blade power transmitting unit connected to a blade motor and the blade rotating shaft for transmitting the power of the blade motor to the blade rotating shaft to thereby rotate the blade rotating shaft.

8. The cutting apparatus according to claim 1, wherein said power rotating shaft of said power transmitting unit and output shaft of the motor are coupled together by a connecting member.

9. The cutting apparatus according to claim 8, wherein said connecting member is a belt.

* * * * *